Oct. 25, 1938.　　　　　W. RAISCH　　　　　2,134,146
METHOD OF MAKING SCREEN PLATES
Filed May 3, 1935　　　　2 Sheets-Sheet 1
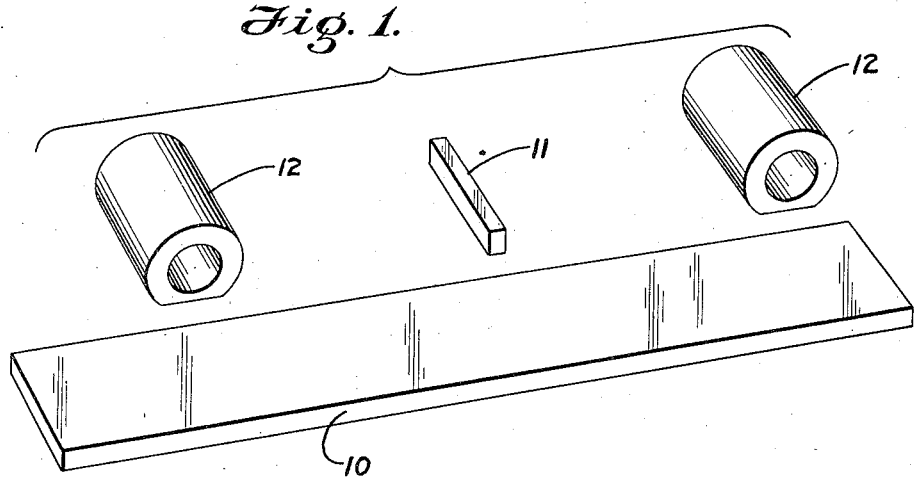
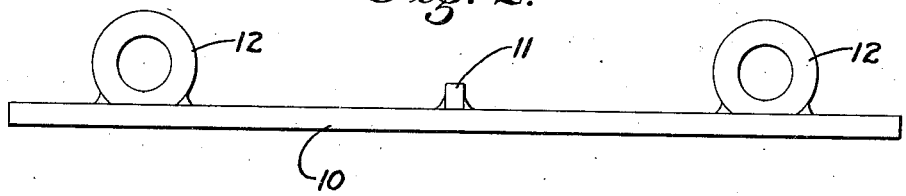
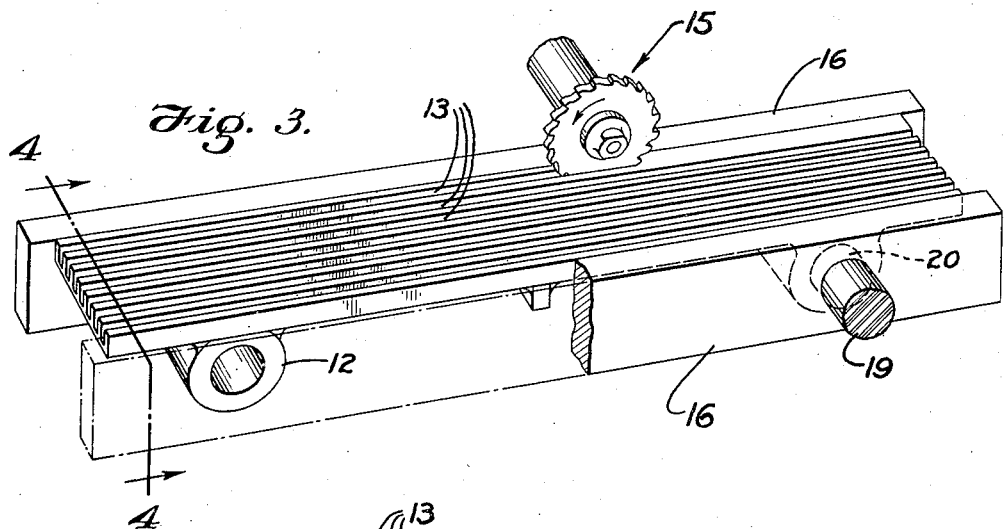
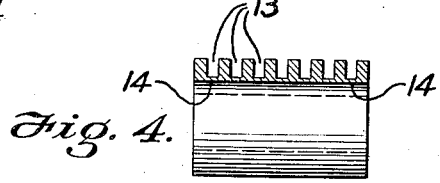
INVENTOR
*William Raisch*
BY
*Louis L. Ansart*
ATTORNEY Oct. 25, 1938.  W. RAISCH  2,134,146
METHOD OF MAKING SCREEN PLATES
Filed May 3, 1935  2 Sheets-Sheet 2
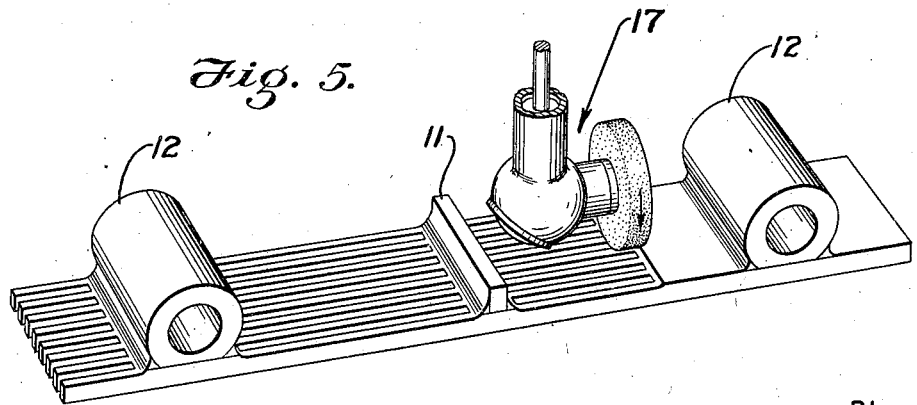
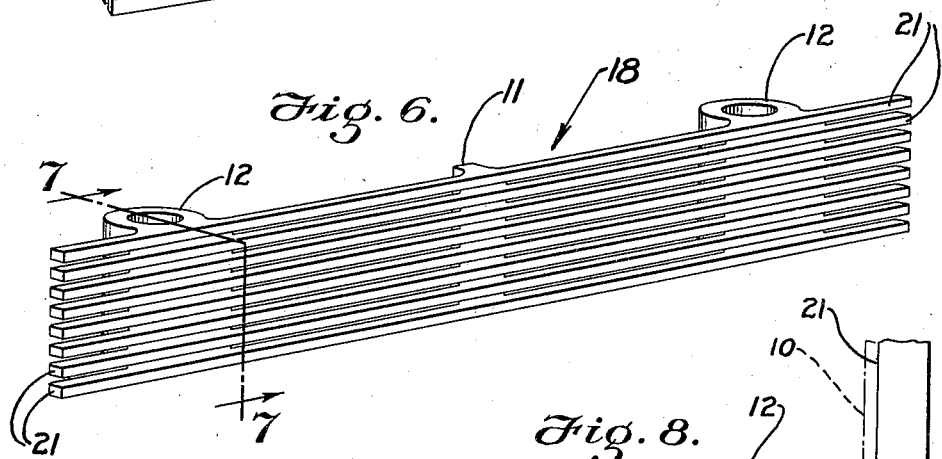
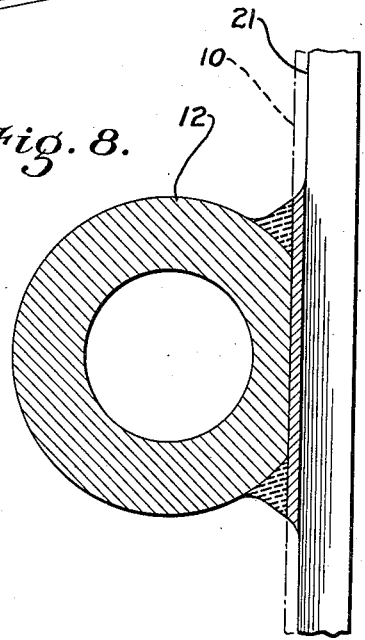
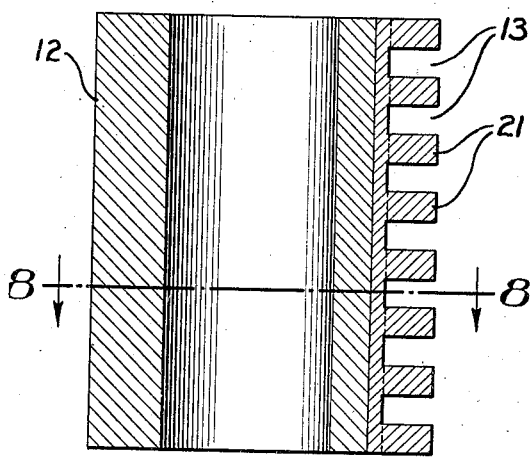
INVENTOR
*William Raisch*
BY
*Louis L. Ansart*
his ATTORNEY Patented Oct. 25, 1938

2,134,146

UNITED STATES PATENT OFFICE 2,134,146

METHOD OF MAKING SCREEN PLATES

William Raisch, Forest Hills, N. Y., assignor to Municipal Sanitary Service Corporation, New York, N. Y., a corporation of New York Application May 3, 1935, Serial No. 19,655

1 Claim. (Cl. 29—163.5)

My invention relates to screens and more particularly to screen plates and methods of making the same.

Heretofore certain screens for removing solids from sewage and other liquids have been formed of one or more sections, which may be in the form of screen plates, each provided with a plurality of narrow slots relatively close together. Such a screen plate has commonly been formed from a single or integral piece of flat metal by milling the slots from the bottom side of the plate. This method of forming the slots would cause the end walls to be curved in conformity with the shape of the milling cutter whereby the slots would be shorter on the top side of the bar than on the bottom and the effective screening area of the screen plate would be reduced to a very considerable extent. Furthermore, traps would be formed in the curved and under cut ends of the milled slots and would tend to collect solid matter and thereby further reduce the effective screening area of the plate. A screen section of another type has heretofore been made of a plurality of bars placed side by side and secured in proper spaced relation either temporarily or permanently as by welding them to suitable transverse members. In this form of screen section it is difficult to produce accurate spacing of the bars.

An important object of the present invention is to provide a novel and advantageous screen plate whereby the above and other disadvantages will be obviated. Another important object is to provide a novel and advantageous method of making such screen plates.

In carrying out the present invention, the blank for the screen section may be in the form of a plate which may be straight or curved according to the use to which the screen section is to be put. After securing to the back of the blank one or more reinforcing members in a suitable manner, as by welding, the formation of the slots is started by cutting deep grooves, as by milling, in the face of the plate. Such grooves are cut nearly to the back face of the plate and preferably from edge to edge thereof so that upon removing metal at the back face, as by grinding, between the reinforcing members at the back of the plate the slots will be opened completely through the plate and will be separated by accurately spaced bars. Ordinarily such slots and consequently the intervening bars will be parallel but for some kinds of screens the slots may be curved and uniformly spaced.

The completed screen plates may be secured in position in any suitable manner but preferably by using some of the reinforcements at the back of the plates for such purposes, for example, by forming some of such reinforcements as sleeves through which supporting rods may be passed. In a prefered form, each screen plate comprises in a unitary or integral structure a plurality of bars extending from edge to edge of the plate and secured together at their backs by reinforcing members extending transversely thereof. Although the bars are not separated entirely at the back of the screen plate there are deep grooves at the face side of the plate so that it will be relatively easy to clean the screen by suitable means moving along the face thereof and projecting into the grooves and slots.

Other objects, features and advantages will appear upon consideration of the following description and of the drawings, in which Fig. 1 is a perspective view of a blank plate and the parts to be secured thereto;

Fig. 2 is a side elevation of a plate with the other parts secured thereto;

Fig. 3 is a perspective view illustrating the formation of slots at the front face of the plate;

Fig. 4 is a sectional view taken along the line 4—4 of Fig. 3;

Fig. 5 is a perspective view illustrating the opening of the slots at the back face of the plate;

Fig. 6 is a perspective view of the completed screen plate;

Fig. 7 is a section taken along the line 7—7 of Fig. 6; and

Fig. 8 is a section taken along the line 8—8 of Fig. 7.

Referring to the drawings, reference numeral 10 designates a plate or blank 10 to which are to be attached a central reinforcing member or bar 11 and reinforcing and attaching members 12, which may be in the form of sleeves flattened at one side for engagement with the back surface of plate 10. As illustrated in Fig. 2, the members 11 and 12 may be secured to the plate 10, as by welding, so as to form a substantially integral structure. After the parts have been assembled as shown in Fig. 2, deep grooves 13 are cut in the front face of the plate 10 leaving only thin connections 14 at the back of the plate. As illustrated in Fig. 3 the cutting of the grooves may be effected by a milling tool 15 and the milling may be effected while the plate is held between bars 16 which may be used as part of the complete screen, these bars being carefully machined into proper straight or curved shape in accordance with the final form of the screen. The plate may be held in position between the bars 16 by rods 19 passing through the sleeves 12 and through suitable openings 20 in bars 16 (Fig. 3).

After completion of the slot forming operation illustrated in Fig. 3, the back surface of the plate 10 is removed, as by use of a grinding tool 17, so as to open up the slots 13 at the back face, and form bars 21 which are connected by means including members 11 and 12. The finished screen plate 18 thus formed may be supported in the final screen structure by means of the same or similar rods 19 passing through the sleeves 12 and through suitable openings 20 in the same or like bars 16. Preferably the grooves 13 are cut from edge to edge of each plate and the plate is so ground that the bars are separated at their ends.

It should be understood that various changes may be made in certain features and that certain features may be used without others without departing from the true scope and spirit of the invention.

Having thus described my invention, I claim:

The method of making a screen plate consisting over the major part of its area of a single set of integrally united parallel bars whose depth coincides with the thickness of the screen plate, which comprises cutting in one side of the plate parallel slots of a substantial length and of a depth greater than the final thickness of the plate and grinding off the material at the other face until the plate is reduced to its final thickness which is less than the depth of the original slots.

WILLIAM RAISCH.